(12) United States Patent
Murata

(10) Patent No.: US 9,327,657 B2
(45) Date of Patent: May 3, 2016

(54) BUS BAR MODULE, VEHICLE POWER SOURCE APPARATUS, AND VEHICLE

(75) Inventor: Takashi Murata, Kasugai (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 379 days.

(21) Appl. No.: 13/816,662

(22) PCT Filed: Aug. 31, 2011

(86) PCT No.: PCT/JP2011/004881
§ 371 (c)(1),
(2), (4) Date: Feb. 12, 2013

(87) PCT Pub. No.: WO2013/030891
PCT Pub. Date: Mar. 7, 2013

(65) Prior Publication Data
US 2013/0234511 A1 Sep. 12, 2013

(51) Int. Cl.
*B60R 16/02* (2006.01)
*H01M 2/10* (2006.01)
*H01M 2/20* (2006.01)
*H01M 10/48* (2006.01)

(52) U.S. Cl.
CPC .............. *B60R 16/02* (2013.01); *H01M 2/1077* (2013.01); *H01M 2/206* (2013.01); *H01M 10/482* (2013.01)

(58) Field of Classification Search
CPC ....... H01M 2/30; H01M 10/50; H01M 2/206; H01M 2/1077; H01M 10/482
See application file for complete search history.

(56) References Cited

U.S. PATENT DOCUMENTS

| | | | | |
|---|---|---|---|---|
| 3,681,509 A * | 8/1972 | Johnston et al. | ............. | 174/16.2 |
| 5,162,616 A * | 11/1992 | Swaffield et al. | ........... | 174/99 B |
| 5,414,344 A * | 5/1995 | Chinn | .............. | 324/72 |
| 7,229,320 B2 * | 6/2007 | Saito et al. | ..................... | 439/627 |
| 7,230,404 B2 * | 6/2007 | Kimoto et al. | ................. | 320/150 |
| 8,096,439 B2 * | 1/2012 | Fogerlie | ........................ | 220/484 |
| 8,449,333 B2 * | 5/2013 | Ikeda et al. | ................... | 439/627 |
| 2002/0102457 A1 * | 8/2002 | Oogami et al. | ............... | 429/159 |
| 2004/0197530 A1 * | 10/2004 | Gritti et al. | ..................... | 428/182 |
| 2008/0009175 A1 | 1/2008 | Kamenoue et al. | | |
| 2011/0027634 A1 * | 2/2011 | Kishimoto et al. | ............. | 429/90 |
| 2012/0009447 A1 | 1/2012 | Ikeda et al. | | |
| 2012/0231640 A1 | 9/2012 | Ikeda et al. | | |
| 2013/0164595 A1 * | 6/2013 | Takase et al. | ................. | 429/120 |

FOREIGN PATENT DOCUMENTS

| | | | |
|---|---|---|---|
| EP | 0708904 | * | 5/2003 |
| JP | 11-144702 A | | 5/1999 |
| JP | 2006-331957 A | | 12/2006 |

(Continued)

*Primary Examiner* — Thienvu Tran
*Assistant Examiner* — Pinping Sun
(74) *Attorney, Agent, or Firm* — Sughrue Mion, PLLC

(57) ABSTRACT

A bus bar module has a bus bar housing portion housing a plurality of bus bars placed side by side in a first direction, and a plurality of voltage detecting lines extending in the first direction and each connected electrically to a different one of the bus bars through a conductive member. The plurality of voltage detecting lines are placed adjacently to the bus bar housing portion and are placed diagonally in a second direction inclined relative to an in-plane direction including the bus bar such that a first region in the plurality of voltage detecting lines separate from the bus bar housing portion is located below a second region in the plurality of voltage detecting lines closer to the bus bar housing portion.

12 Claims, 6 Drawing Sheets

(56) References Cited

FOREIGN PATENT DOCUMENTS

| JP | 2008-17638 A | 1/2008 |
| JP | 2010-257686 A | 11/2010 |
| WO | 2009022521 A1 | 2/2009 |
| WO | 2010/122412 A1 | 10/2010 |
| WO | 2011043261 A1 | 4/2011 |
| WO | WO 2011052699 A1 * | 5/2011 ........... G01N 27/416 |

* cited by examiner

BUS BAR MODULE, VEHICLE POWER SOURCE APPARATUS, AND VEHICLE

CROSS REFERENCE TO RELATED APPLICATIONS

This application is a National Stage of International Application No. PCT/JP2011/004881 filed Aug. 31, 2011, the contents of all of which are incorporated herein by reference in their entirety.

TECHNICAL FIELD

The present invention relates to a structure of a bus bar module installed on an assembled battery having a plurality of stacked cells.

BACKGROUND ART

A known electric storage apparatus for storing an electric power to be supplied to a motor for running a vehicle is an assembled battery having a plurality of cells, a pair of end plates placed at positions between which the cells are sandwiched, and a restraint band restraining the plurality of cells by connecting the pair of end plates. The assembled battery of this type is provided with a plurality of voltage detecting lines for obtaining voltage information of each of the cells, and each of these voltage detecting lines is electrically connected to each of the cells.

Patent Document 1 has disclosed a power source apparatus having battery units stacked vertically in stages, each battery unit including a plurality of battery modules arranged in parallel with the same horizontal plane in a holder case. In each of the battery units, a bus bar is coupled to output terminals at the ends of the battery modules placed at predetermined positions in the holder case to connect each of the battery modules. An isolating member is placed between the battery modules of the battery unit in the upper stage and the battery modules of the battery unit in the lower stage and along the ends of the battery modules of the battery unit in the upper stage. The isolating member is formed as a liquid-receiving bath opened upward which can receive an electrolytic solution drained from the ends of the battery modules of the battery unit in the upper stage. The liquid-receiving bath of the isolating member stores the electrolytic solution drained from the battery modules of the battery unit in the upper stage or conveys and lets out the received electrolytic solution to a predetermined position to prevent the electrolytic solution from causing a short-circuit of the battery modules in the upper and lower stages.

PRIOR ART DOCUMENT

Patent Document

[Patent Document 1] Japanese Patent Laid-Open No. 2006-331957

DISCLOSURE OF THE INVENTION

Problems to be Solved by the Invention

The assembled battery described above may cause condensation thereon depending on temperature conditions. For example, when the assembled battery has a cooling path for cooling by using air in the interior of a car, an increase in humidity of the interior of the car causes condensation. When the condensation occurs in the assembled battery, the water produced in the condensation may cause electrical continuity between the connecting portions of the voltage detecting lines and the cells. On the other hand, in the method of providing the isolating member with the aid of the technology described in Patent Document 1, the water of condensation can be avoided but the additional member increases the cost and prevents a reduction in size. To address this, it is an object of the present invention to prevent electrical continuity between connecting portions of voltage detecting lines and cells through water produced in condensation or the like while an increase in the number of parts is suppressed.

Means for Solving the Problems

To solve the problems described above, a bus bar module according to the present invention is installed on an assembled battery including a plurality of stacked cells and holding a plurality of bus bars each connecting terminal electrodes of ones of the cells adjacent in a direction of the stacking, including a bus bar housing portion housing the plurality of bus bars placed side by side in a first direction, and a plurality of voltage detecting lines extending in the first direction and each connected electrically to a different one of the bus bars through a conductive member, wherein the plurality of voltage detecting lines are placed adjacently to the bus bar housing portion and are placed diagonally in a second direction inclined relative to an in-plane direction including the bus bar such that a first region in the plurality of voltage detecting lines separate from the bus bar housing portion is located below a second region in the plurality of voltage detecting lines closer to the bus bar housing portion.

(2) In the configuration described above in (1), the conductive member extends in the second direction from the bus bar to support the plurality of voltage detecting lines. According to the configuration of (2), a portion of the conductive member is extended and the extended portion is connected electrically to the voltage detecting line to provide the connecting structure for acquiring voltage information, so that the connecting structure can be simplified. In addition, since an independent structure supporting the plurality of voltage detecting lines is not required, a smaller size and a lower cost can be achieved.

(3) In the configuration described above in (2), an insulating extending support portion is included which supports the conductive member and extends in the second direction longer than the plurality of voltage detecting lines. The extending support portion has a discharge port formed at an end portion in the second direction and a guide rib guiding water flowed from the plurality of voltage detecting lines toward the discharge port. According to the configuration of (3), since the water flowing on the plurality of voltage detecting lines in the inclination direction is guided toward the discharge port by the guide rib, dewatering can be performed from a particular position (for example, a position where a short circuit is not made by the water).

(4) In the configuration described above in (3), the plurality of bus bars include a first bus bar and a second bus bar adjacent to each other in the first direction, the extending support portion includes a first extending support portion associated with the first bus bar and a second extending support portion associated with the second bus bar, and a spacing is formed between the first extending support portion and the second extending support portion in the first direction, and the spacing is formed at a position associated with a region between the first bus bar and the second bus bar. According to the configuration of (4), since water can be prevented from flowing from the first extending support portion to the second extending support portion, the object of the present invention can be achieved more effectively.

(5) In the configuration described above from (1) to (4), a sheet unit can be provided by housing the plurality of voltage detecting lines in a sheet-shaped insulating case. According to the configuration of (5), water can be released easily along an outer face of the sheet unit.

To solve the problems described above, a vehicle power source apparatus according to the present invention (6) includes an assembled battery including a plurality of cells stacked in a first direction and storing an electric power to be supplied to a motor for use in running of a vehicle, and a bus bar module holding a plurality of bus bars each connecting terminal electrodes of ones of the cells adjacent in the first direction, wherein the bus bar module includes a bus bar housing portion housing the plurality of bus bars placed side by side in the first direction, and a plurality of voltage detecting lines extending in the first direction and each connected electrically to a different one of the bus bars through a conductive member, and the plurality of voltage detecting lines are placed adjacently to the bus bar housing portion and are placed diagonally in a second direction inclined relative to an in-plane direction including the bus bar such that a first region in the plurality of voltage detecting lines separate from the bus bar housing portion is located below a second region in the plurality of voltage detecting lines closer to the bus bar housing portion.

(7) In the configuration described above in (6), the conductive member extends in the second direction from the bus bar to support the plurality of voltage detecting lines. According to the configuration of (7), a portion of the conductive member is extended and the extended portion is connected electrically to the voltage detecting line to provide the connecting structure for acquiring voltage information, so that the connecting structure can be simplified. In addition, since an independent structure supporting the plurality of voltage detecting lines is not required, a smaller size and a lower cost can be achieved.

(8) In the configuration described above in (7), an insulating extending support portion is included which supports the conductive member and extends in the second direction longer than the plurality of voltage detecting lines. The extending support portion has a discharge port formed at an end portion in the second direction and a guide rib guiding water flowed from the plurality of voltage detecting lines toward the discharge port. According to the configuration of (8), since the water flowing on the plurality of voltage detecting lines in the inclination direction is guided toward the discharge port by the guide rib, dewatering can be performed from a particular position (for example, a position where a short circuit is not made by the water).

(9) In the configuration described above in (8), the plurality of bus bars include a first bus bar and a second bus bar adjacent to each other in the first direction, the extending support portion includes a first extending support portion associated with the first bus bar and a second extending support portion associated with the second bus bar, and a spacing is formed between the first extending support portion and the second extending support portion in the first direction, and the spacing is formed at a position associated with a spacing formed between the first bus bar and the second bus bar. According to the configuration of (9), since water can be prevented from flowing from the first extending support portion to the second extending support portion, the object of the present invention can be achieved more effectively.

(10) In the configuration described above from (6) to (9), the plurality of voltage detecting lines has an extending portion extending from the assembled battery, and the extending portion is connected to an acquiring section acquiring voltage information through a connector and has a flex portion flexed downward. According to the configuration of (10), water flowing toward the connector through the extending portion can be dropped at the flex portion. This can protect the acquiring portion.

(11) In the configuration described above from (6) to (10), a sheet unit can be provided by housing the plurality of voltage detecting lines in a sheet-shaped insulating case. According to the configuration of (11), water can be released easily along an outer face of the sheet unit.

(12) The vehicle power source apparatus described from (6) to (11) can be mounted on a vehicle.

Advantage of the Invention

According to the present invention, electrical continuity can be prevented between connecting portions of voltage detecting lines and cells through water produced in condensation or the like while an increase in the number of parts is suppressed.

BEST MODE FOR CARRYING OUT THE INVENTION

Figure 1:
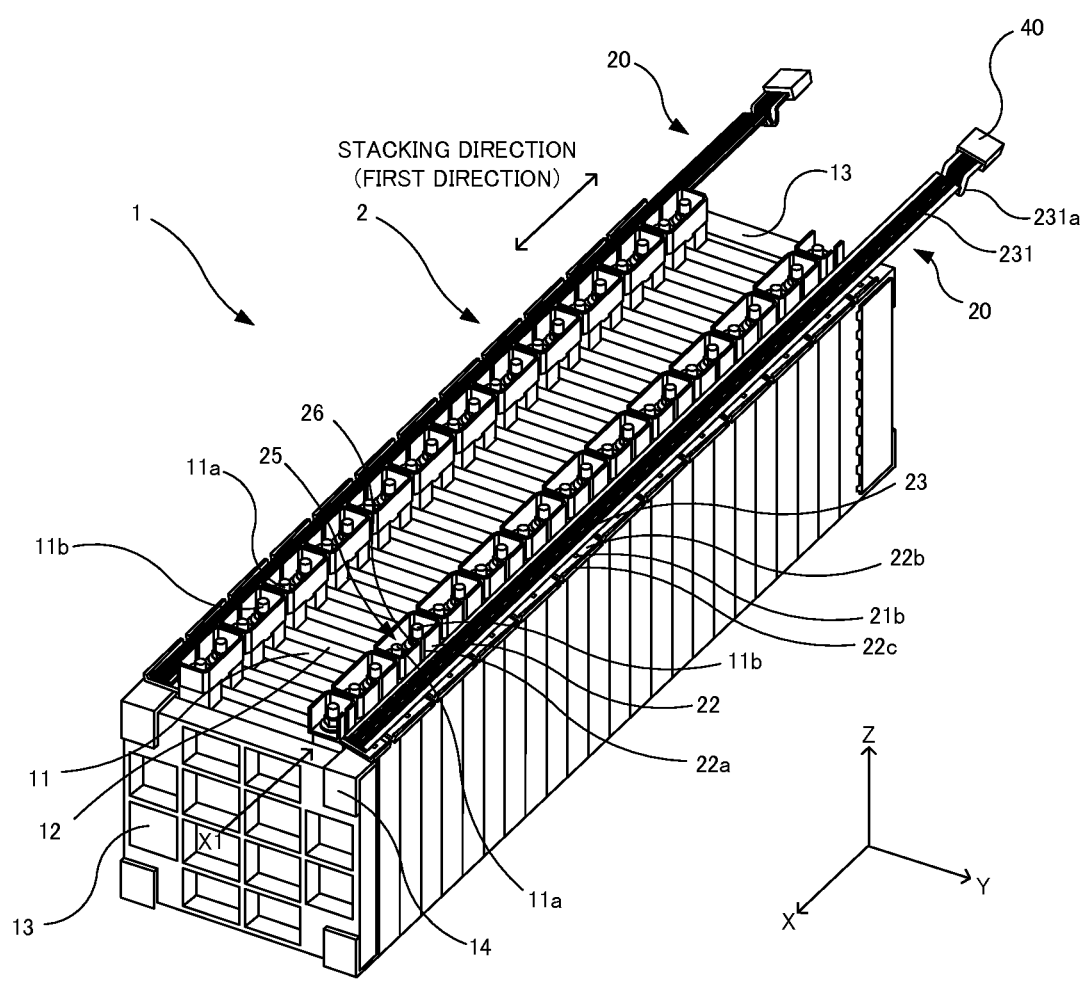
FIG. 1 is a perspective view of a vehicle power source apparatus.
Figure 2:
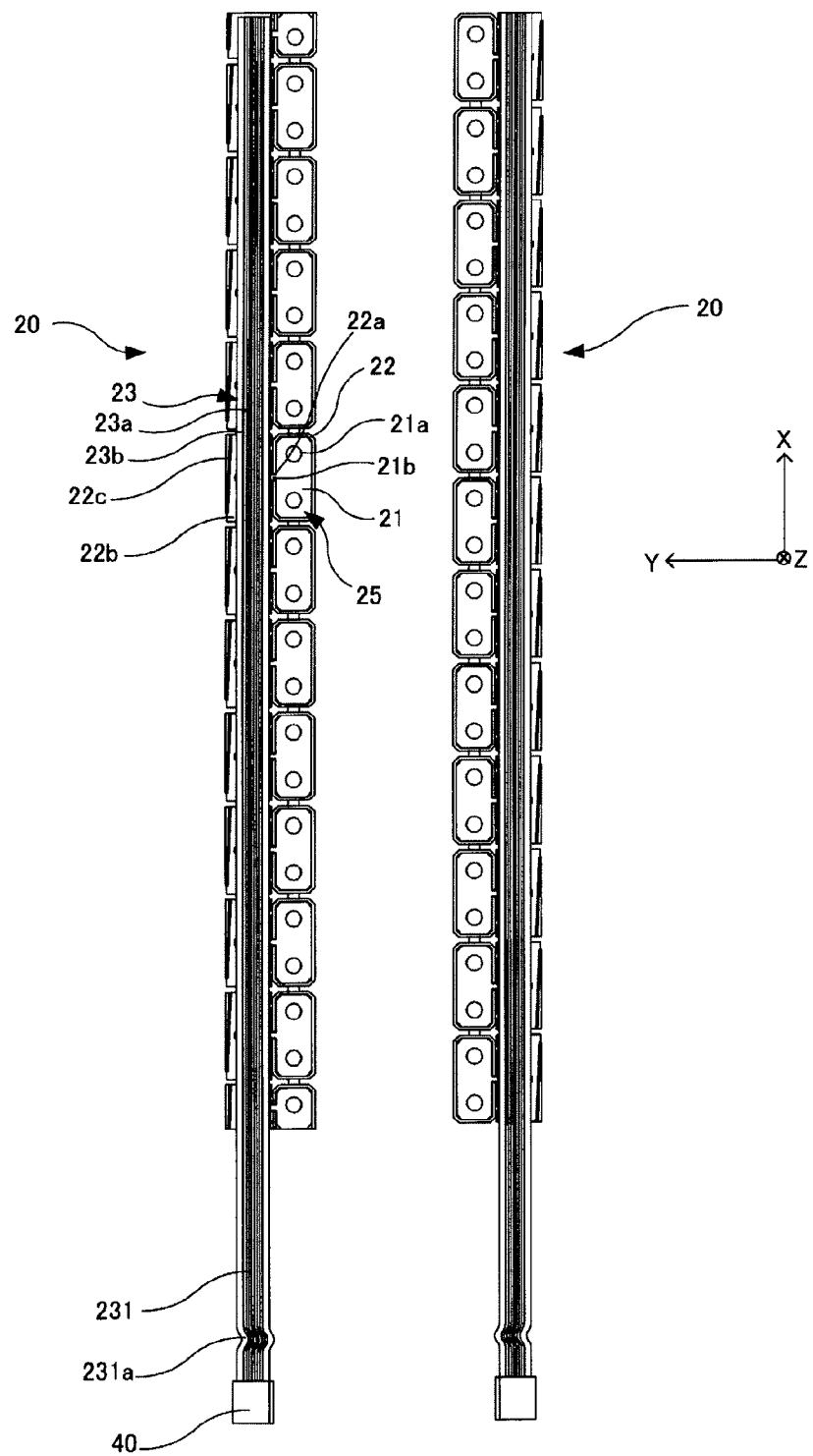
FIG. 2 is a plan view of a bus bar module.

A vehicle power source apparatus which is an embodiment of the present invention is described with reference to FIG. 1 and FIG. 2. FIG. 1 is a perspective view of the vehicle power source apparatus, and FIG. 2 is a plan view of a bus bar module. An X axis, a Y axis, and a Z axis are three axes orthogonal to each other, and the definition of the X axis, the Y axis, and the Z axis applies to the other figures.

A vehicle power source apparatus 1 stores an electric power to be supplied to a motor for use in running of a vehicle. The vehicle may be a hybrid car which uses both of the vehicle power source apparatus 1 and an internal-combustion engine as the power source, or may be an electric car which uses only the vehicle power source apparatus 1 as the power source. The vehicle power source apparatus 1 can be placed in a luggage room of the vehicle, under a rear seat, a space between a driver's seat and a passenger's seat and the like.

The vehicle power source apparatus 1 has a plurality of cells 11, a plurality of spacer members 12, a pair of end plates 13, a plurality of restraint bands 14, and a bus bar module 20. The plurality of cells 11 are arranged in the X axis direction (first direction). A secondary battery such as a nickel metal hydride battery and a lithium-ion battery or a capacitor can be used as the cell 11. The cell 11 can be formed of a single battery cell or a battery module including a plurality of battery cells connected to each other. The battery cell refers to the smallest unit of an element capable of charge and discharge. The plurality of cells 11, the plurality of spacer members 12, and the pair of end plates 13 constitute an assembled battery 2.

The cell 11 is a so-called square battery having a pair of outer faces opposite to each other in the X axis direction, a pair of outer faces opposite to each other in the Y axis direction, and a pair of outer faces opposite to each other in the Z axis direction. The cell 11 has a positive electrode terminal 11a and a negative electrode terminal 11b placed side by side in the Y axis direction on the one of the pair of opposite outer faces in the Z axis direction that is located on the upper side. Each of the positive electrode terminal 11a and the negative electrode terminal 11b is formed in a protruding shape and has a screw thread formed in an outer face for tightening a nut 26. The positive electrode terminal 11a in one of the cells 11 adjacent in the X axis direction is adjacent to the negative electrode terminal 11b in the other cell 11 in the x axis direction, and the adjacent positive electrode terminal 11a and negative electrode terminal 11b are connected to each other through a bus bar 21. This connects the plurality of cells 11 in series, so that a high battery output can be obtained to meet the output requirement of the vehicle.

The spacer member 12 is placed at a position sandwiched between the cells 11 adjacent in the X direction. A plurality of ribs, not shown, are formed on an outer face of the spacer member 12 in the X direction. These ribs can abut on outer faces of the cells 11 to form a coolant path for a coolant flowing along the outer faces of the cells 11. The spacer member 12 can be made of resin, for example.

The pair of end plates 13 are connected to each other by the restraint bands 14 extending in the X axis direction. The restraint band 14 has a bent portion bent in an L-shape at each end in the X axis direction. The bent portion is fixed to the end plate 13 to restrain the cells 11 and the spacer members 12 with a predetermined pressure. Riveting can be used for the fixing method. The cells 11 can be restrained with the predetermined pressure in this manner to provide the required battery output. The end plate 13 is formed in a rectangular shape when viewed from the X axis direction, and the restraint band 14 is provided at each of four corners of the end plate 13. The end plate 13 can be made of resin. The restraint band 14 can be made of sheet metal.

Figure 3:
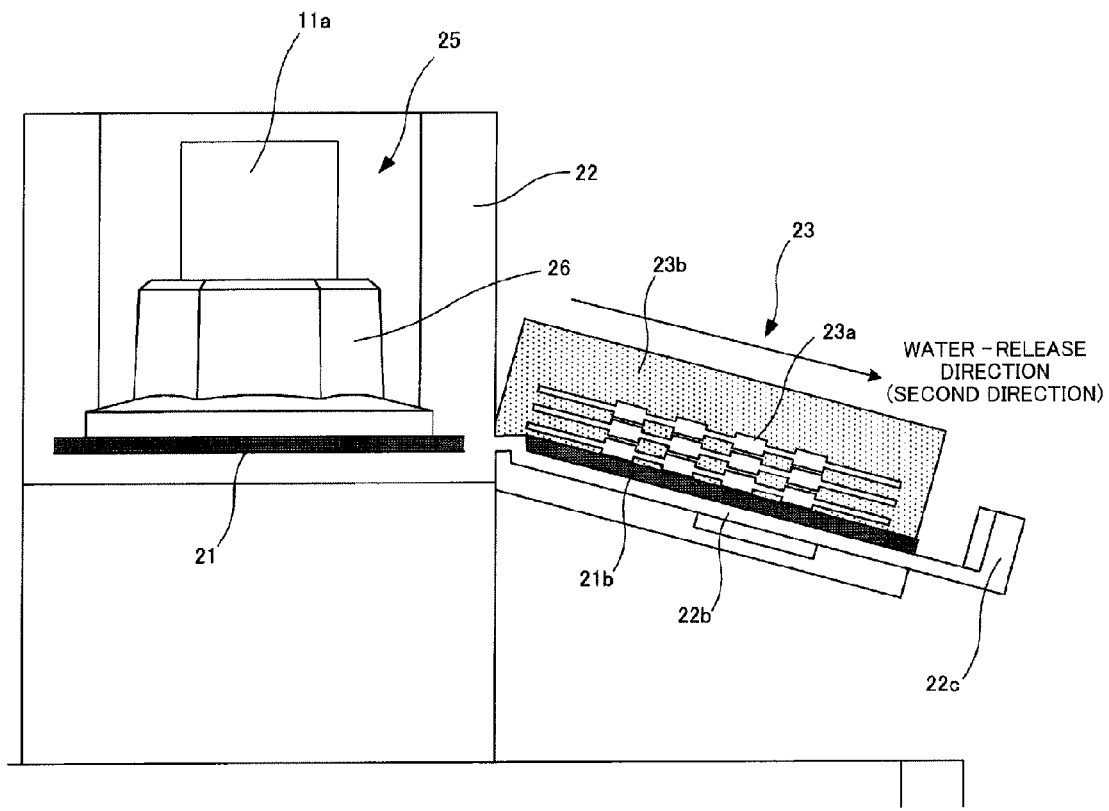
FIG. 3 is an enlarged plan view enlargedly showing part of the bus bar module installed on an assembled battery.
Figure 4:
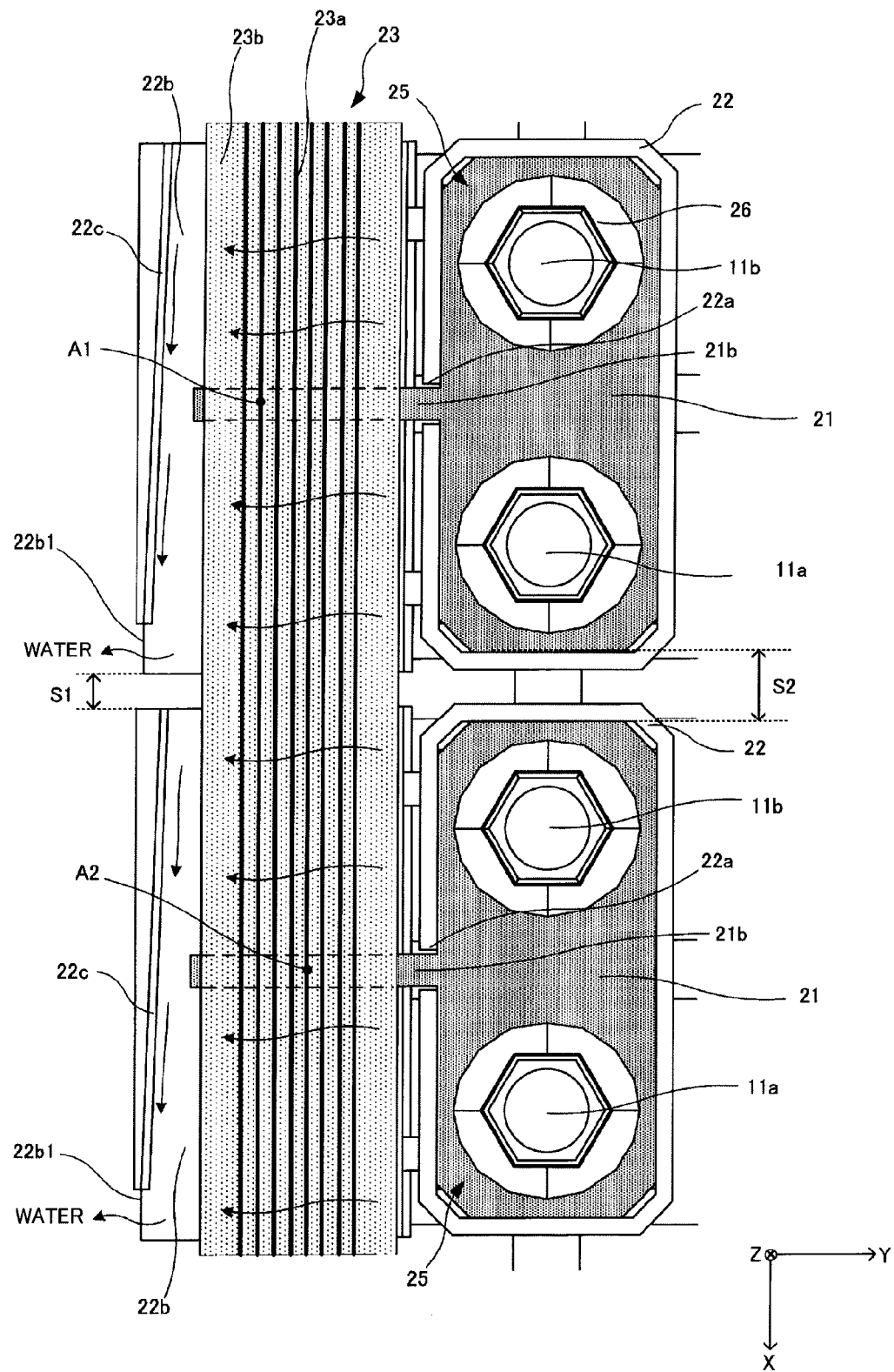
FIG. 4 is a diagram of the vehicle power source apparatus in FIG. 1 viewed from an arrow X1.

Next, the bus bar module 20 is described in detail with reference to FIG. 1 to FIG. 4. FIG. 3 is an enlarged plan view enlargedly showing part of the bus bar module 20 installed on the assembled battery. FIG. 4 is a diagram of the vehicle power source apparatus in FIG. 1 when viewed from an arrow X1. In these figures, the bus bar 21 is covered with a protecting wall 22 in an in-plane direction including the bus bar 21. The region surrounded by the protecting wall 22 corresponds to a bus bar housing portion 25. The protecting wall 22 is made of an insulating material. The provision of the protecting wall 22 can prevent electrical continuity between the bus bars 21 adjacent in the X axis direction through a conductive foreign matter. The protecting wall 22 has a height in the Z axis direction set to be larger than that of the positive electrode terminal 11a (negative electrode terminal 11b). Thus, even when a tool or the like used in fastening the bus bar 21 is inadvertently dropped, electrical continuity between the bus bars 21 adjacent in the X axis direction through the tool can be prevented.

The bus bar 21 has a pair of terminal inserting holes 21a formed therein which receive the positive electrode terminal 11a in one of the cells 11 adjacent in the X axis direction and the negative electrode terminal 11b in the other cell 11. An extending conductive portion (corresponding to a conductive portion) 21b extending in a diagonally downward direction (corresponding to a second direction) inclined relative to the in-plane direction including the bus bar 21 is formed at one end of the bus bar 21 in the Y axis direction. In the present specification, the diagonally downward direction is referred to as a "water-release direction."

The protecting wall 22 has a slit 22a formed therein for drawing the extending conductive portion 21b of the bus bar 21 to the outside of the protecting wall 22. The slit 22a extends from an upper end toward a lower portion of the protecting wall 22. An extending support portion 22b extending in the water-release direction is formed in the lower portion of the protecting wall 22. The extending support portion 22b supports the extending conductive portion 21b and is made of an insulating material similar to that of the protecting wall 22. The extending support portion 22b may be integral with or may be separate from the protecting wall 22.

A sheet unit 23 placed adjacently to the bus bar housing portion 25 is supported on the extending conductive portion 21b. Thus, the sheet unit 23 is inclined in the water-release direction inclined relative to the in-plane direction including the bus bar 21. In other words, in the sheet unit 23, a first region of the sheet unit 23 separate from the bus bar housing portion 25 is located below a second region of the sheet unit 23 closer to the bus bar housing portion 25.

The sheet unit 23 includes a plurality of voltage detecting lines 23a and a pair of plastic film tapes 23b surrounding and holding these voltage detecting lines 23a. The pair of plastic film tapes 23b are bonded on contact faces thereof in contact with each other. Heat fusion or an adhesive can be used as the bonding method. The plurality of voltage detecting lines 23a are placed generally at regular intervals and each extend in a direction in which the cells 11 are stacked (corresponding to the first direction). The plurality of voltage detecting lines 23a are insulated from each other in the plastic film tapes 23b. Each of the voltage detecting lines 23a is connected to the associated extending conductive portion 21b. Specifically, referring to FIG. 4, the extending conductive portion 21b in one of the bus bars 21 placed adjacently in the X axis direction is connected to the associated voltage detecting line 23a in a connecting portion A1, and the extending conductive portion 21b in the other bus bar 21 is connected to the associated voltage detecting line 23a in a connecting portion A2.

Water produced from condensation in the bus bar housing portion 25 may flow toward the sheet unit 23 placed adjacently to the bus bar housing portion 25. If the sheet unit 23 is placed in the in-plane direction including the bus bar 21, that is, in the horizontal direction, the flowed water stays on the sheet unit 23. If part of the plastic film tape 23b is damaged due to long-term use, the water staying on the sheet unit 23 may flow into the sheet unit 23 through the damaged portion to cause electric continuity between the connecting portions A1 and A2. In contrast, since the sheet unit 23 is placed diagonally in the water-release direction in the present embodiment, the water flowed from the bus bar housing portion 25 can be released along the inclined face of the sheet unit 23. This can prevent the water from staying on the sheet unit 23 to avoid electrical continuity between the connecting portions A1 and A2.

The angle of the water-release direction with respect to the horizontal direction, that is, the inclination angle, can be set at 15°, for example. With the setting of the inclination angle at 15°, the flowed water can be released more reliably without staying on the sheet unit 23.

The extending support portion 22b extends longer than the sheet unit 23 in the water-release direction and has a discharge port 22b1 formed at a tip portion. The discharge port 22b1 is formed in a notch shape at one end of the extending support portion 22b in the X axis direction. The extending support portion 22b has a guide rib 22c formed thereon, and the guide rib 22c extends from the other end of the extending support portion 22b in the X axis direction toward the discharge port 22b1. The guide rib 22c is diagonally placed to extend closer to the tip portion of the extending support portion 22b toward the discharge port 22b1.

The water flowed from the sheet unit 23 to the extending support portion 22b abuts on the guide rib 22c and moves toward the discharge port 22b1 while being guided by the guide rib 22c. Thus, the water produced in the condensation can be released to a predefined position (for example, a position where a short circuit is not made by the water). The inclination angle of the guide rib 22c relative to the X axis direction (the stacking direction of the cells 11) can be set to 5°, for example. The setting of the inclination angle to 5° can guide the flowed water toward the discharge port 22b1 more reliably.

Referring to FIG. 4, a spacing S1 is formed between the extending support portions 22b adjacent in the X axis direction. The spacing S1 is located in association with a region S2 sandwiched between the bus bars 21 adjacent in the X axis direction (corresponding to a first bus bar and a second bus bar). In other words, the spacing S1 is set to have a dimension such that the position thereof in the X axis direction falls within the region S2. This can prevent the water from flowing from one of the adjacent extending support portions (corresponding to a first extending support portion) 22b into the other extending support portion (corresponding to a second extending support portion) 22b. Thus, electrical continuity between the connecting portions A1 and A2 through the water can be prevented more effectively.

Figure 5:
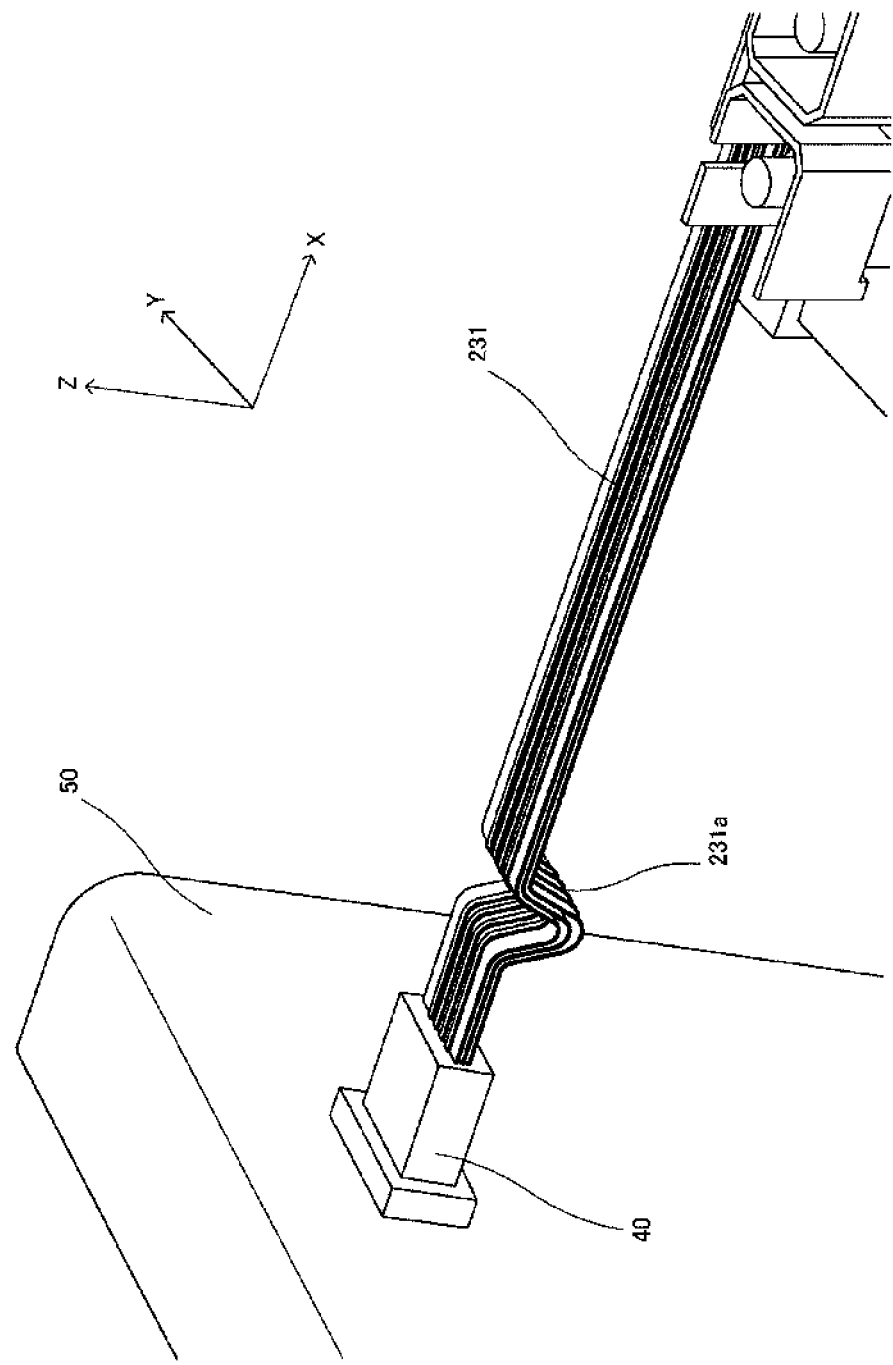
FIG. 5 is a perspective view of a sheet unit and a monitor unit connected thereto.

Referring to FIG. 5, the sheet unit 23 has an extending portion 231 formed thereon to extend from the region where the assembled battery 2 is located. The extending portion 231 is connected to a monitor unit (corresponding to an acquiring section) 50 through a connector 40. The monitor unit 50 acquires voltage information of each of the cells 11 through the sheet unit 23 and transmits the results to a higher level ECU, not shown. The higher level ECU controls the SOC (State Of Charge) or the like of the cells 11 based on the acquired voltage information.

The extending portion 231 has a flex portion 231a flexed downward. The water moving from the sheet unit 23 toward the connector 40 is collected in the flex portion 231a and is dropped, so that the flow of the water into the connector 40 can be prevented. Since a water-stop structure can be provided only by flexing part of the sheet unit 23 in this manner, the number of parts can be reduced to achieve a smaller size and a lower cost.

Modification 1

Figure 6:
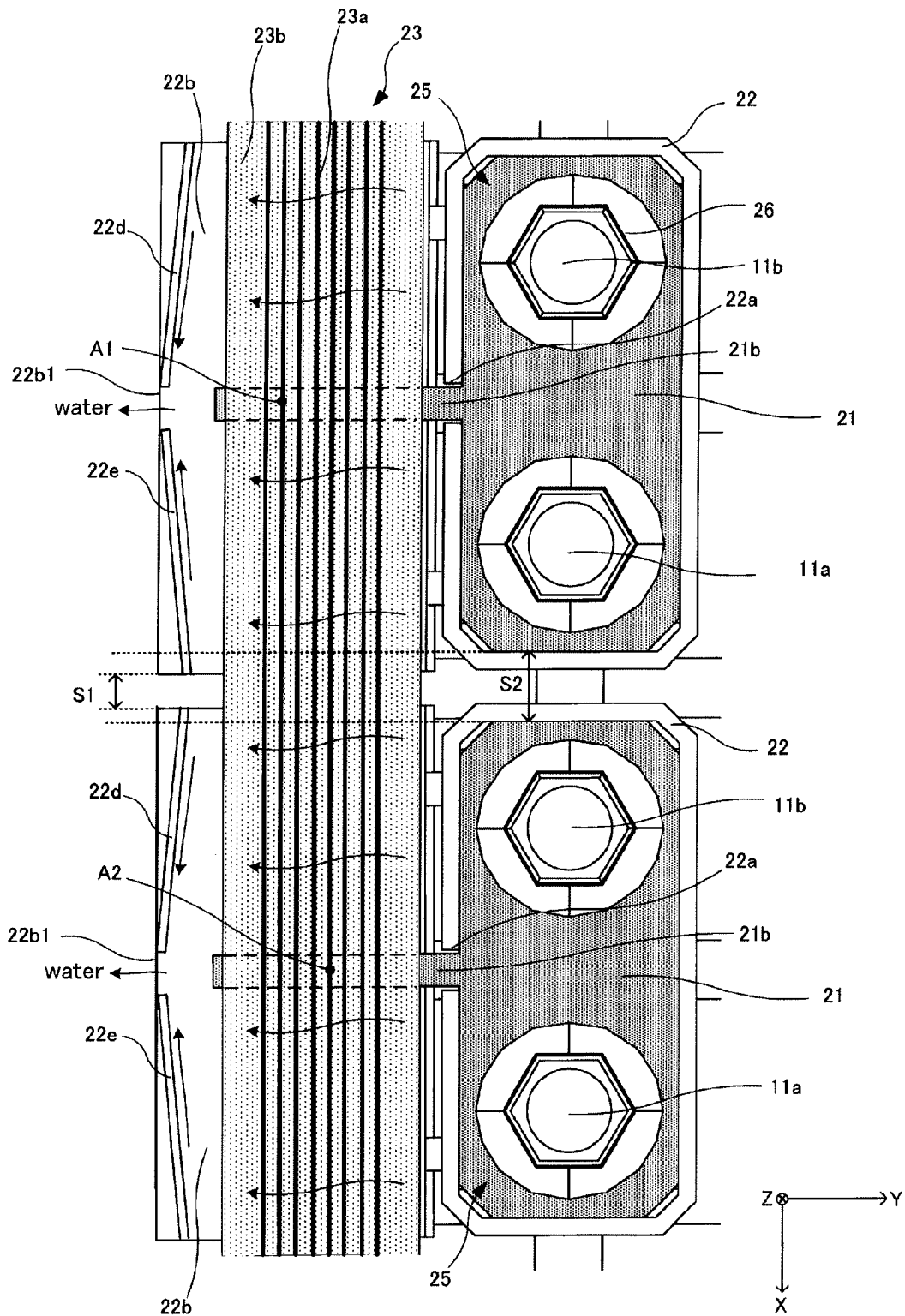
FIG. 6 is an enlarged plan view showing a bus bar module according to Modification 1 and corresponding to FIG. 3.

While the discharge port 22b1 is formed at the one end of the extending support portion 22b in the X axis direction in the embodiment described above, the present invention is not limited thereto. Referring to FIG. 6, the discharge port 22b1 may be formed generally at the center of the extending support portion 22b in the X axis direction. In this case, the guide rib can be formed of a first guide rib 22d extending from one end of the extending support portion 22b in the X axis direction toward the discharge port 22b1 and a second guide rib 22e extending from the other end of the extending support portion 22b in the X axis direction toward the discharge port 22b1.

Modification 2

While part of the bus bar 21 is extended to provide the conductive member (extending conductive portion) in the embodiment described above, the present invention is not limited thereto. A conductive member can be provided independently to connect the bus bar 21 and the voltage detecting lines 23a electrically.

Modification 3

While the sheet unit 23 is provided by surrounding the plurality of voltage detecting lines 23a in the pair of plastic film tapes 23b, the present invention is not limited thereto, and another configuration can be used. In the other configuration, the plastic film tapes 23b may be omitted. In this case, the plurality of voltage detecting line 23a are collectively placed diagonally in the water-release direction. According to this configuration, the water can be released more easily as compared with the configuration in which the plurality of voltage detecting lines 23a are placed horizontally.

The invention claimed is:

1. A bus bar module installed on an assembled battery including a plurality of stacked cells and holding a plurality of bus bars each connecting terminal electrodes of ones of the cells adjacent in a direction of the stacking, comprising:
   a bus bar housing portion housing the plurality of bus bars placed side by side in a first direction;
   a plurality of voltage detecting lines extending in the first direction and each connected electrically to a different one of the bus bars through a conductive member; and
   a holding portion extending in the first direction and holding the plurality of voltage detecting lines,
   wherein the terminal electrodes are arranged on a top face of each of the cells and the bus bar module is arranged above the assembled battery, the holding portion is placed adjacently to the bus bar housing portion and is downwardly inclined from the bus bar housing portion, and
   a first region of the holding portion separate from the bus bar housing portion is located below a second region of the holding portion that is closer to the bus bar housing portion than the first region.

2. The bus bar module according to claim 1, wherein the conductive member is an elongate protrusion that is integrally formed with the bus bar and protrudes in the second direction from the bus bar to support the plurality of voltage detecting lines, and
   the plurality of voltage detecting lines are aligned in the second direction on the conductive member.

3. The bus bar module according to claim 2, further comprising an insulating extending support portion supporting the conductive member and extending in the second direction longer than the plurality of voltage detecting lines,
   wherein the extending support portion has a discharge port formed at an end portion in the second direction and a guide rib guiding water flowed from the plurality of voltage detecting lines toward the discharge port.

4. The bus bar module according to claim 3, wherein the plurality of bus bars include a first bus bar and a second bus bar adjacent to each other in the first direction,
   the extending support portion includes a first extending support portion associated with the first bus bar and a second extending support portion associated with the second bus bar, and
   a spacing is formed between the first extending support portion and the second extending support portion in the first direction, and the spacing is formed at a position associated with a region between the first bus bar and the second bus bar.

5. The bus bar module according to claim 4, wherein the holding portion is a sheet unit housing the plurality of voltage detecting lines in a sheet-shaped insulating case.

6. A vehicle power source apparatus comprising:
an assembled battery including a plurality of cells stacked in a first direction and storing an electric power to be supplied to a motor for use in running of a vehicle; and
a bus bar module holding a plurality of bus bars each connecting terminal electrodes of ones of the cells adjacent in the first direction,
wherein the bus bar module includes:
a bus bar housing portion housing the plurality of bus bars placed side by side in a first direction;
a plurality of voltage detecting lines extending in the first direction and each connected electrically to a different one of the bus bars through a conductive member; and
a holding portion extending in the first direction and holding the plurality of voltage detecting lines,
wherein the terminal electrodes are arranged on a top face of each of the cells and the bus bar module is arranged above the assembled battery,
the holding portion is placed adjacently to the bus bar housing portion and is downwardly inclined from the bus bar housing portion, and
a first region of the holding portion separate from the bus bar housing portion is located below a second region of the holding portion that is closer to the bus bar housing portion than the first region.

7. The vehicle power source apparatus according to claim 6, wherein the conductive member is an elongate protrusion that is integrally formed with the bus bar and protrudes in the second direction from the bus bar to support the plurality of voltage detecting lines, and the plurality of voltage detecting lines are aligned in the second direction on the conductive member.

8. The vehicle power source according to claim 7, further comprising an insulating extending support portion supporting the conductive member and extending in the second direction longer than the plurality of voltage detecting lines,
wherein the extending support portion has a discharge port formed at an end portion in the second direction and a guide rib guiding water flowed from the plurality of voltage detecting lines toward the discharge port.

9. The vehicle power source apparatus according to claim 8, wherein the plurality of bus bars include a first bus bar and a second bus bar adjacent to each other in the first direction,
the extending support portion includes a first extending support portion associated with the first bus bar and a second extending support portion associated with the second bus bar, and
a spacing is formed between the first extending support portion and the second extending support portion in the first direction, and the spacing is formed at a position associated with a spacing formed between the first bus bar and the second bus bar.

10. The vehicle power source apparatus according to claim 6, wherein the plurality of voltage detecting lines has an extending portion extending from the assembled battery, and
the extending portion is connected to an acquiring section acquiring voltage information through a connector and has a flex portion flexed downward.

11. The vehicle power source apparatus according to claim 6, the holding portion is a sheet unit housing the plurality of voltage detecting lines in a sheet-shaped insulating case.

12. A vehicle on which the vehicle power source apparatus according to claim 6 is mounted.

* * * * *